United States Patent [19]

Yan

[11] Patent Number: 4,892,567

[45] Date of Patent: Jan. 9, 1990

[54] SIMULTANEOUS REMOVAL OF MERCURY AND WATER FROM FLUIDS

[75] Inventor: Tsoung Y. Yan, Philadelphia, Pa.

[73] Assignee: Mobil Oil Corporation, New York, N.Y.

[21] Appl. No.: 232,194

[22] Filed: Aug. 15, 1988

[51] Int. Cl.[4] .............................................. B01D 52/04
[52] U.S. Cl. ............................................ 55/33; 55/72; 55/75; 55/389; 210/688; 210/914; 502/75; 502/347
[58] Field of Search ................... 55/31, 33, 35, 72, 75, 55/389; 210/688, 914; 423/99, 210; 502/75, 344, 347, 348

[56] References Cited

U.S. PATENT DOCUMENTS

| | | |
|---|---|---|
| 2,424,083 | 7/1947 | Finch et al. |
| 2,463,228 | 3/1949 | West et al. .................... 502/348 |
| 2,882,243 | 4/1959 | Milton ............................ 55/75 X |
| 2,910,139 | 10/1959 | Matyear, Jr. ................. 55/31 X |
| 2,982,612 | 5/1961 | Barrer et al. ................. 55/75 X |
| 3,013,982 | 12/1961 | Breck et al. |
| 3,033,642 | 5/1962 | Bukata et al. ................ 55/75 X |
| 3,193,987 | 7/1965 | Manes et al. ..................... 55/72 |
| 3,200,082 | 8/1965 | Breck et al. ................. 55/75 X |
| 3,257,776 | 6/1966 | Park et al. ......................... 55/72 |
| 3,331,190 | 7/1961 | Glew et al. |
| 3,374,608 | 3/1968 | Manes ............................... 55/72 |
| 3,563,914 | 2/1971 | Wattimena ................... 502/348 |
| 3,597,169 | 8/1971 | Savage ............................ 55/75 X |
| 3,658,467 | 4/1972 | Maeck ............................ 55/75 X |
| 3,786,619 | 1/1974 | Melkersson et al. ............. 55/72 |
| 3,838,554 | 10/1974 | Wilhelm et al. ............ 55/75 X |
| 3,876,393 | 4/1975 | Kasai et al. .................. 55/72 X |
| 3,933,431 | 1/1976 | Trujillo et al. .............. 55/72 X |
| 4,019,880 | 4/1977 | Rabo et al. ................... 55/75 X |
| 4,088,737 | 5/1978 | Thomas et al. ............... 55/75 X |
| 4,101,631 | 7/1978 | Ambrosini et al. .......... 55/72 X |
| 4,105,588 | 8/1978 | Balducci et al. ............ 502/75 X |
| 4,137,054 | 1/1979 | Miyake et al. ................ 55/75 X |
| 4,207,210 | 6/1980 | Kilty ............................. 502/348 |
| 4,366,092 | 12/1982 | Winterton ..................... 502/347 |
| 4,419,107 | 12/1983 | Roydhouse .................... 55/72 X |
| 4,471,071 | 9/1984 | Rebsdat et al. .............. 502/347 |
| 4,591,490 | 5/1986 | Horton ............................ 55/72 X |
| 4,690,013 | 9/1987 | Nojiri et al. ................ 502/347 X |
| 4,708,853 | 11/1987 | Matviya et al. .............. 55/72 X |
| 4,717,399 | 1/1988 | Audeh ................................ 55/72 |
| 4,717,703 | 1/1988 | Cognion et al. ............. 502/347 X |
| 4,743,276 | 5/1988 | Nishida et al. ............. 55/75 X |

FOREIGN PATENT DOCUMENTS

| | | | |
|---|---|---|---|
| 0241391 | 10/1987 | European Pat. Off. ............ 502/347 |
| 2841565 | 4/1980 | Fed. Rep. of Germany .......... 55/72 |
| 2310795 | 1/1977 | France . |
| 633565 | 11/1978 | U.S.S.R. ......................... 55/72 |

OTHER PUBLICATIONS

Barrer et al., J. Chem. Soc. (A), 19–25 (1967).

*Primary Examiner*—Robert Spitzer
*Attorney, Agent, or Firm*—Alexander J. McKillop; Charles J. Speciale

[57] ABSTRACT

A regenerable molecular sieve comprises 0.001-15% elemental silver or gold in or on zeolite A. The molecular sieve is capable of simultaneously removing mercury and water from a fluid. A method for impregnating zeolite A with elemental silver or gold comprising treating the zeolite A with a solution of a silver or gold salt of a carboxylic acid and heating the impregnated zeolite A at a temperature sufficient to decompose the salt is also provided. A method for simultaneously and repeatedly removing mercury and water from a hydrocarbon fluid by contacting the fluid with an effective amount of a molecular sieve comprising zeolite A and 0.001-15% elemental silver or gold and regenerating the zeolite A at elevated temperatures is also provided.

62 Claims, No Drawings

SIMULTANEOUS REMOVAL OF MERCURY AND WATER FROM FLUIDS

BACKGROUND OF THE INVENTION

This invention is directed to a method for simultaneously removing mercury and water from fluids by contacting the fluids with zeolite A activated by silver or gold. The invention further relates to silver- or gold-activated zeolite A and to methods for removing mercury and water from fluids using such activated zeolite A.

It is often desirable to remove water from fluids, such as from hydrocarbon fluids, an example being natural gas. Water can be effectively removed from such fluids by means of molecular sieves, particularly the synthetic crystalline zeolite known as zeolite A.

Zeolite A contains cavities formed by sodalite cages stacked in simple cubic form. The sodalite cages are made up of truncated octahedra having a silica or alumina tetrahedron at each point. The cavities are surrounded by eight oxygen atoms, and are partially blocked by cations that balance the charge on the oxygen atoms. In zeolite A, each alumina moiety is balanced by two positive charges. If the cation is sodium, the cavity is reduced to about 4.2 angstroms in diameter. If the cation is potassium, the cavity is reduced to about 3 angstroms in diameter. If the cation is calcium, the cavity is reduced to about 5 angstroms in diameter.

Zeolite A having sodium, potassium, and calcium ions are known as zeolite 4A, zeolite 3A and zeolite 5A, respectively. The pore diameters of zeolite A make them especially suitable as drying agents, since the pores are large enough to accommodate water molecules, but not most other molecules found in nature Zeolite A is further described in U.S. Pat. Nos. 2,882,243; 2,982,612; and 3,650,687.

When a zeolite used for drying fluids becomes saturated with water, it must be regenerated, which is often accomplished by heating with flowing hot gas. Zeolite 4A is the most commonly used molecular sieve for this purpose.

It is also important to remove mercury from fluids. For example, natural gas may contain as much as 250 ppb (micrograms/m$^3$) mercury. Following the drying procedure described above, the natural gas is, in many commercial liquefaction operations, transported to aluminum heat exchangers. Mercury present in the natural gas causes corrosion of the aluminum, and must be removed.

Methods for removing mercury from fluids such as natural gas are available. For example, U.S. Pat. Nos. 4,101,631 and 4,474,896 describe the removal of mercury from gas streams by means of sulphur or sulphur compounds on supports such as zeolites and activated carbon. Such methods are capable of reducing the level of mercury to about 0.1 ppb. Even this level of mercury in a stream, however, can injure aluminum heat exchangers.

There is, therefore, a need to reduce the level of mercury in fluids to below 0.01 ppb or less. In order to be commercially feasible, the method should be inexpensive as well as efficient. Since water must often also be removed from hydrocarbon fluids, it would be especially desirable to be able to remove mercury and water simultaneously and repeatedly from a fluid with the same agent, so that, following contact with the agent, the level of mercury is less than 0.01 ppb and the level of water is less than 1 ppm. A composition of matter capable of simultaneously removing mercury and water from a fluid must be able to be regenerated many times simultaneously for both of these purposes in order to be considered efficient enough to be commercially feasible.

It is a principle object of the present invention to provide a molecular sieve capable of simultaneously removing water and mercury from fluids and of being able to be simultaneously regenerated many times for both these purposes. Further objectives of the present invention are to provide a process for making such a molecular sieve and a method for using it to remove water and mercury simultaneously from fluids.

These and other objectives as will be apparent to those of ordinary skill in the art have been met by providing a regenerable molecular sieve comprising 0.001–15% elemental silver or gold in or on zeolite A. The molecular sieve is capable of simultaneously removing mercury and water from a fluid. A method for impregnating zeolite A with elemental silver or gold comprising treating the zeolite A with a solution of a silver or gold salt of a carboxylic acid and heating the impregnated zeolite A at a temperature sufficient to decompose the salt is also provided. Finally, a method for simultaneously and repeatedly removing mercury and water from a hydrocarbon fluid by contacting the fluid with an effective amount of a molecular sieve comprising zeolite A and 0.001–15% elemental silver or gold and regenerating the zeolite A at elevated temperatures is also provided. Where silver is discussed as the metal for removing mercury, it is to be understood that gold may generally be substituted for silver.

DETAILED DESCRIPTION OF THE INVENTION

The zeolite A useful in the present invention is known as a molecular sieve drying agent Milton, U.S. Pat. No. 2,882,243 and Barrer et al., U.S. Pat. No. 2,982,612 have described zeolite A as well as methods for making it. The description of zeolite A and the methods for making it in the Milton and Barrer et al. patents are incorporated herein by reference.

The basic method for preparing the sodium form of zeolite A, of which there are many variations, comprises heating an aqueous solution of suitable sources of $Na_2O$, $Al_2O_3$, and $SiO_2$ for a period of time sufficient to permit crystallization from the hot mixture. According to the procedure disclosed by Milton in U.S. Pat. No. 2,882,243, pure zeolite A may be produced by heating at approximately 100° C. a reaction mixture whose composition expressed as mole ratios of the oxides of sodium, silicon and aluminum fall within one of the following ranges:

|  | Range 1 | Range 2 |
| --- | --- | --- |
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

After 2.5–90 hours, the product that crystallizes from the hot mixture is filtered and washed with distilled water until the effluent wash water in equilibrium with the zeolite has a pH of about 9–12.

Barrer et al. disclose in U.S. Pat. No. 2,982,612 that the reaction mixture composition expressed in terms of oxide mole ratios may also be:

| | |
|---|---|
| Na$_2$O/SiO$_2$ | 0.3–1.0 |
| SiO$_2$/Al$_2$O$_3$ | 4–6 |
| H$_2$O/Na$_2$O | 130–300 |

This composition should be heated from about 60°–110° C. for a period of time depending on the temperature. For example, at about 60° C., pure zeolite A crystallizes between 2–5 days. At about 90° C., pure zeolite A crystallizes between 1–5 days. At about 110° C., pure zeolite A crystallizes between 1–5 hours.

The mixtures described above are heated until pure zeolite A crystallizes. Heating may continue to maximize the yield of zeolite A. Excessive heating, however, causes contaminating crystalline species to be present in the reaction mixture. Zeolite A may be identified on the basis of its formula, which is:

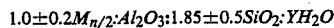

$$1.0 \pm 0.2 M_{n/2} : Al_2O_3 : 1.85 \pm 0.5 SiO_2 \cdot YH_2O$$

wherein M represents a metal such as sodium, potassium or calcium, n represents the valence of the metal, and Y is a number up to about 6. Sodium zeolite A has an X-ray powder diffraction pattern characterized by at least the following major d values of reflection (in Å)

12.2±0.2
8.6±0.15
7.02±0.15
5.45±0.10
4.06±0.05
3.68±0.05
3.38±0.05
3.26±0.05
2.96±0.05
2.73±0.05
2.61±0.05

The zeolite A is activated for drying by removing the water from the cavities of the crystals. This may be accomplished by heating at temperatures up to about 600° C.

The zeolite A described above is effective at removing water from fluids. In order to make a composition of matter that simultaneously removes water and mercury, a relatively small amount of elemental silver or gold is added to the zeolite A. Elemental silver is preferred.

The capacity of silver on zeolite A for mercury removal depends on the operating conditions, such as the temperature, fluid superficial velocity, pressure, mercury content in the feed, and impurities in the feed, such as H$_2$S. The superficial velocity of a gas is the velocity of the gas in a vessel per cross sectional area of the vessel when it is empty. The actual velocity of a gas in a vessel containing, for example, zeolite molecular sieves will be greater than the superficial velocity.

For example, the capacity of silver on zeolite 4A for mercury removal is $7 \times 10^{-3}$ grams mercury/gram silver at a gas contact time of $3 \times 10^{-3}$ sec, which occurs, for example, when the gas flow rate is 26.5 feet/second through a bed 1 inch in depth. The gas contact time is the bed depth divided by the flow rate.

When the zeolite is saturated with water (i.e., about 20–25% by weight), the mercury adsorption rate is reduced by, for example, about 50%, although the mercury adsorption capacity is not significantly affected. For this reason, in one embodiment of the invention, the silver or gold is more heavily concentrated at the end of the zeolite bed away from the direction of fluid flow (i.e., the bottom of the bed when the fluid flows from the top of the bed to the bottom). For example, there might be a gradient of silver or gold concentrations throughout the bed, or all of the silver or gold might be distributed more or less evenly in the ⅔, ½, or ⅓ of the bed away from the direction of fluid flow, or a combination of these arrangements, i.e., a gradient of silver or gold concentrations in the ⅔, ½ or ⅓ of the bed away from the direction of fluid flow.

The capacity of silver or gold on zeolite A to remove mercury increases linearly with the contact time to the ultimate limit of about one atom of mercury per atom of silver or gold. Therefore, it is advantageous to operate at low superficial velocity in order to improve the extent of mercury removal and/or to reduce the amount of silver required. The amount of silver or gold depends upon the amount of mercury present in the fluid, the amount of mercury to be removed from the fluid, the flow rate of the fluid through the bed, the contact time of the fluid with the adsorbent, and the ability of the zeolite A to be regenerated. The amount of silver to be added to zeolite A, for example, may be calculated on the basis of the ability of 1 gram of silver on zeolite A to remove $7 \times 10^{-3}$ grams of mercury from a fluid at a contact time of $3 \times 10^{-3}$ seconds. For example, the amount of silver in the zeolite A may be as low as about 0.1% by weight, about 0.01% by weight, about 0.001% by weight, and even lower. The amount of silver or gold in the zeolite A may be as high as at least about 1%, about 5%, about 10% by weight and even higher.

Since silver and gold are expensive, the amount of silver and gold in the zeolite A should be as small as possible. Another reason for minimizing the amount of silver or gold in the zeolite A is that the efficiency of removing mercury from fluids tends to increase as the concentration of silver or gold decreases. In addition, higher concentrations of silver or gold tend to impair the water removing capacity of the zeolite. Therefore, in another embodiment of the invention, the silver or gold is applied substantially uniformly to all of the zeolite in the bed that is being used to dry the fluid.

Although less preferred, it is also possible to prepare zeolite A with a higher concentration of silver than is desired, and to admix with untreated zeolite A so as to obtain the desired concentration.

A useful guideline for determining the amount of silver or gold to be added to the zeolite is to add approximately 2–100 times the stoichiometric amount of silver or gold necessary to remove enough mercury from a fluid during each cycle to reduce the mercury content to or below the level desired assuming one atom of silver or gold removes one atom of mercury. The amount of silver or gold is preferably approximately 3–30 times, more preferably approximately 10 times, the stoichiometric amount necessary to reduce the mercury to or below the level desired.

The silver or gold may be added to the zeolite A by ion exchanging or impregnating zeolite A with an aqueous solution of a salt of silver or gold that is sufficiently soluble in water, optionally calcining the treated zeolite A at elevated temperatures, for example at about 200°–500° C., and reducing the silver or gold ions or oxides in or on the zeolite. Ion exchange involves contacting the zeolite with a sufficient excess of a solution of the silver or gold salt for a sufficient amount of time to permit the silver or gold ions to permeate the cavities of the zeolite and to replace the ions present in the cavities. Impregnation involves contacting the zeolite with the solution so that the silver or gold ions from the solution remain on or near the surface of the zeolite. Impregnation may, for example, be conveniently accomplished by spraying. Impregnation is preferred. Some suitable silver salts that are sufficiently soluble in water include silver chlorate, silver perchlorate and silver nitrate. Some suitable salts of gold that are sufficiently soluble in water include $AuCl_3$ and $Au(CN)_3$. The pH of solutions into which zeolite A comes into contact should be maintained at a pH>6 by adding an alkali such as NaOH, KOH or $NH_4OH$. $NH_4OH$ is preferred. Some suitable reducing agents include hydrogen gas or a hydrocarbon gas such as methane, ethylene, ethane, propylene, propane, butenes, butanes and mixtures thereof. Such gases require heating at elevated temperatures, for example at 200°–400° C. The reduction can conveniently be accomplished simultaneously with the drying of the zeolite, which is usually carried out with hot natural gas. The reduction may also take place at room temperature with reducing agents such as formaldehyde.

Another method for preparing zeolite A containing silver is to mill the zeolite with $Ag_2O$ or other silver compounds capable of being converted into elemental silver. The milled zeolite is extruded, dried, optionally calcined, and reduced to convert the silver compound to elemental silver.

Preferably, however, the silver is added to the zeolite A by means of impregnating the zeolite A with a solution of a silver or gold salt that is sufficiently soluble in $H_2O$, and that decomposes directly to elemental silver upon heating. Some suitable salts include Ag and Au salts of a carboxylic acid. Some suitable silver salts of a carboxylic acid include, for example, silver acetate, silver propionate, silver lactate and silver salicylate Silver acetate is preferred. Upon heating to a temperature of about 180°–500° C., the silver or gold salt decomposes directly to elemental silver or gold impregnated on the zeolite A. A minimum temperature of 200° is preferred. This decomposition may conveniently be accomplished when the zeolite is being activated for drying by heating.

For example, silver acetate is soluble in water to the extent of about 1%. In the impregnation operation as described above, zeolite A adsorbs approximately 30% of its weight in water. Accordingly, impregnating zeolite A with a saturated aqueous solution of silver acetate followed by removal of the water from the zeolite results in zeolite A containing 0.3% silver. The process can be repeated if a higher percentage of silver is desired. If it is desired to minimize the number of impregnation steps, more than 0.3% silver may be added to zeolite A by contacting the zeolite with a solution containing more silver salt of a carboxylic acid than the zeolite can adsorb, and evaporating the solvent. The salt solution used to impregnate the zeolite may also contain less than 1% of silver acetate if the amount of silver on the zeolite A is desired to be less than 0.3%.

The method of impregnation with a solution of the silver or gold salt capable of decomposing directly to elemental silver, such as a carboxylic acid, may be applied directly to zeolite A that is already being used on-line in a dryer vessel to remove water from a fluid. The solution is added directly to wet on-line zeolite A in a drying chamber. The aqueous solution of the silver or gold salt will rapidly, essentially homogeneously, permeate through the zeolite. Upon heating to about 180°–500° C., a substantially homogeneous distribution of silver or gold will be provided to the zeolite A.

Zeolite A containing elemental silver or gold is less likely to lose its water-adsorbing properties when the silver or gold is added by means of impregnation, particularly impregnation with a salt of a carboxylic acid such as silver acetate, followed by decomposition with heat than if the silver or gold is added by means of ion exchange followed by reduction. When the silver or gold is introduced by means of ion exchange with a salt such as $AgNO_3$ or $AuCl_3$ followed by reduction, amounts of silver or gold on the zeolite A greater than 1% and especially greater than 5% lead to decreasing water-adsorbing efficiency when the silver- or gold-containing zeolite A is subjected to reduction and heating conditions.

The zeolite A containing silver or gold as described above may be used to remove water and mercury simultaneously from a fluid. The fluid may be liquid or gaseous. The temperature of the operation may advantageously be maintained between 0° and 300° C., preferably between 20° and 200° C., more preferably between 25° and 100° C. The gas hourly space velocity depends on the mercury level in the fluid, the amount of silver in the adsorbent, and the degree of mercury removal desired and may be as low as 1,000 v/v hr and as much as ten million v/v hr. The gas hourly space velocity is preferably 10,000–100,000 v/v hr. The pressure at which the simultaneous water and mercury removal and the regeneration steps are conducted is not critical. Some suitable pressures for water and mercury removal include, for example, 0–2000 pounds, preferably 10–1000 pounds.

The amount of zeolite A in the water- and mercury-removing chamber and the amount of silver or gold on the zeolite A depend upon the amount of water and mercury that is to be removed from the fluid and on the flow of the fluid through the zeolite. In a typical drying operation, about one pound of zeolite 4A is estimated for each 0.1 pound of water to be removed. The amount of silver to be added to the zeolite depends on the gas contact time, the amount of mercury to be removed, as well as on other factors, as discussed above.

The zeolite A containing silver or gold is regenerated for removing water under the same conditions as is zeolite A in the absence of the metals. The temperature of the regeneration process may, for example, be between 40° and 700° C., preferably 100° to 600° C., and more preferably 200° to 400° C. In general, the adsorbent can be regenerated more efficiently in a shorter period of time at higher temperatures. The regeneration should be conducted in the absence of oxygen (i.e., in an inert or reducing gas). If the fluid being dried is natural gas, the natural gas can conveniently constitute the inert gas. Preferably, the direction of gas flow for the regeneration step is the reverse of that for water and mercury removal. The regeneration flow rate will generally be much lower than for water and mercury removal. Some suitable flow rates for regeneration include, for example, $10-10^6$, preferably $10^2-10^5$, more preferably $10^3-10^4$ v/v hr. The regeneration pressure may be, for example, 0–1000 pounds, preferably 10–100 pounds. The zeolite may be regenerated 100 times and even more under these conditions.

If the silver or gold is added by decomposing a salt of a carboxylic acid, the number of regenerations the silver-or gold-containing zeolite can tolerate without significantly losing its water adsorbing capacity does not depend upon the amount of silver or gold in the zeolite. If, on the other hand, the silver or gold is ion exchanged into the zeolite by means of salts such as $AgNO_3$ or $AuCl_3$, the regeneration conditions described above may lead to deterioration of the capacity of the zeolite for water at levels above about 1% Ag or Au, and especially above about 5%.

EXAMPLES

Example 1

Preparation of silver on zeolite 4A with silver acetate.

A 1% aqueous silver acetate solution containing 0.1548 g of silver acetate is added dropwise to 10 g of 40-60 mesh 4A molecular sieves. During the addition, the sieves are mixed and tumbled to assure a uniform application of the silver. The excess water is vaporized from the sieves and the sieves are dried in a vacuum oven at 100° C. for 60 min. to obtain a zeolite 4A adsorbent containing 1% Ag.

Example 2

Preparation of silver on zeolite 4A with silver nitrate.

A. Reduction with $H_2$ $AgNO_3$ (0.157 g) is dissolved in 3 cc $H_2O$, and $NH_4OH$ is added to adjust the pH to 7.5. This solution is slowly added dropwise to 10 g of 40-60 mesh 4A sieves while the sieves are stirred. The excess water is evaporated and the product is dried in the vacuum oven at 100° C. for 60 min. The dried product is heated in air at a rate of 1° C./min to 400° C. and kept at 400° C. for 30 min. The calcined product is reduced by heating at 1° C./min to 340° C. in $H_2$ flowing at a rate of 100 cc/min.

B. Reduction with Methane

Example 2 is repeated, except the reduction occurs in a flow of methane instead of $H_2$.

Example 3

Removal of mercury from gas stream with zeolite 4A containing 1% silver.

Zeolite 4A extrudates are crushed and sized to 40/60 mesh. The crushed zeolite is impregnated with aqueous silver acetate solution and dried according to Example 1. The silver constitutes 1% of the weight of the zeolite. The zeolite is dried in a vacuum oven at 110° C. for 1 hour.

The silver-containing zeolite (0.0705 grams) was placed in a capillary tube having an inner diameter of approximately 1 mm to form a bed about 4 cm long. Pure nitrogen gas was placed over the bed and the bed was heated to 340° C. in order to decompose the silver acetate in the absence of oxygen. The resulting zeolite 4A contained approximately 1% elemental silver.

Nitrogen gas containing a known amount of mercury was passed through the bed of zeolite 4A/silver at a rate of 300 cc/minute at 25° C. for about 22 hours. These conditions are equivalent to a gas contact time of $3 \times 10^{-3}$ sec and a gas hourly space velocity of 200,000 v/v hours. The zeolite was regenerated by heating under a nitrogen atmosphere at 340° C. for one to two hours. The mercury removal/zeolite regeneration cycle was repeated 5 additional times. The results are shown below:

| Run No | Hg. (ppb) Feed | Hg. (ppb) Product | Hg Removal, (%) |
|---|---|---|---|
| 1 | 0.92 | 0.0058 | 99.36 |
| 2 | 0.92 | 0.0053 | 99.42 |
| 3 | 0.92 | 0.0060 | 99.34 |
| 4 | 0.68 | 0.0059 | 99.13 |
| 5 | 1.12 | 0.0077 | 99.31 |
| 6 | 1.12 | 0.0092 | 99.18 |

The adsorption/regeneration cycles are repeated one hundred times. The performance of the zeolite 4A/Ag remains excellent.

Example 4

Effect of water on mercury removal from gas fluids.

The experiment described in Example 3 is repeated with nitrogen gas containing 3.3% water. The gas flow rate was 353 cc/minute. The results are shown below:

| Run No | Hg. (ppb) Feed | Hg. (ppb) Product | Hg Removal, (%) |
|---|---|---|---|
| 1 | 0.24 | 0.0077 | 96.8 |
| 2 | 0.067 | 0.0046 | 93.1 |
| 3 | 0.22 | 0.0058 | 97.4 |

Example 5

Effect of $H_2S$ on mercury removal from gas fluids.

The experiment described in Example 4 is repeated except that the nitrogen contains 1 ppm $H_2S$ and the flow rate is 375 cc/minute. The results are shown below:

| Run No | Hg. (ppb) Feed | Hg. (ppb) Product | Hg Removal, (%) |
|---|---|---|---|
| 1 | 0.64 | 0.032 | 95.0 |
| 2 | 0.74 | 0.039 | 94.7 |
| 3 | 0.68 | 0.026 | 96.2 |
| 4 | 0.70 | 0.015 | 97.9 |

Example 6

Removal of Mercury from gas fluids at high pressure and temperature

Example 3 is repeated except that for the water and mercury adsorption step, the pressure is 725 psi, the temperature is 72° F. and the flow rate is 4.44 ft/min. For the regeneration step, the pressure is 60 psi, the temperature is 650° F., the flow rate is 0.32 ft/min and the time period is about 3 hrs. The nitrogen contains 0.267 ppb Hg before contact with the zeolite and 0.003 ppb after contact.

Example 7

Removal of mercury from hydrocarbon gas.

Examples 3-6 are repeated using natural gas instead of nitrogen. The results are comparable.

Example 8

Removal of mercury from natural gas on large scale.

Natural gas is passed from top to bottom through 40,000 lbs. of zeolite 4A containing 1% elemental silver prepared according to the method of Example 1. The drying chamber containing the 40,000 lbs. of zeolite 4A is 11 feet x 11 feet. The natural gas contains about 0.08 ppb mercury and is passed through the zeolite at a rate of about 0.5 feet per second. The residence time of the gas in the drying chamber is about 20 seconds. The natural gas at the bottom of the drying chamber contains less than 0.01 ppb mercury. The water-removal capability of the zeolite is not affected by the mercury adsorption.

Example 9

Preparation of zeolite A in a drying chamber containing elemental silver on large scale.

A drying chamber having the dimensions of 11 feet×11 feet is filled with about 40,000 lbs. of zeolite 4A. The zeolite is equilibrated with water to contain about 7,000 lbs. of water. Twelve hundred pounds of a 1% solution of silver acetate are added to the top of the wet zeolite. The solution trickled through the bed to a depth of about 2 ft. The zeolite is dried and the silver acetate decomposed to elemental silver by heating at 340° C. for 3 hours.

What we claim is:

1. A method for simultaneously removing mercury and water from a fluid comprising contacting the fluid with an effective amount of a molecular sieve comprising zeolite A containing on its surface 0.001–15% weight of elemental silver or gold and regenerating the molecular sieve for simultaneous water and mercury removal at elevated temperatures.

2. The method according to claim 1 wherein the fluid is a hydrocarbon fluid.

3. The method according to claim 2 wherein the hydrocarbon fluid is a gas.

4. The method according to claim 3 wherein the gas is natural gas.

5. The method according to claim 1 wherein the hydrocarbon fluid is contacted with the zeolite A at a temperature between 0° and 300° C. and a gas hourly space velocity between 1000 and ten million v/v hr.

6. The method according to claim 1 wherein the zeolite A is regenerated at temperatures between 100° C. and 600° C.

7. The method according to claim 1 wherein the molecular sieve comprises zeolite A and elemental silver.

8. The method according to claim 1 wherein the molecular sieve consists essentially of zeolite A and elemental silver.

9. The method according to claim 1 wherein the zeolite A contains 0.001–10% elemental silver.

10. The method according to claim 1 wherein the zeolite A contains 0.01–1% elemental silver.

11. The method according to claim 1 wherein the zeolite A is zeolite 4A.

12. The method according to claim 1 wherein the elemental silver is impregnated onto zeolite A by treating zeolite A with an aqueous solution of silver acetate and heating the silver acetate at temperatures between 100°–600° C.

13. A method for simultaneously removing mercury and water from a fluid comprising contacting the fluid with an effective amount of a molecular sieve comprising zeolite A containing in its cavities 0.001–5% by weight of elemental silver or gold and regenerating the molecular sieve for simultaneous water and mercury removal at elevated temperatures.

14. The method according to claim 13 wherein the fluid is a hydrocarbon fluid.

15. The method according to claim 14 wherein the hydrocarbon fluid is a gas.

16. The method according to claim 15 wherein the gas is natural gas.

17. The method according to claim 13 wherein the hydrocarbon fluid is contacted with the zeolite A at a temperature between 0° and 300° C. and a gas hourly space velocity between 1000 and ten million v/v hr.

18. The method according to claim 13 wherein the zeolite A is regenerated at temperatures between 100° C. and 600° C.

19. The method according to claim 13 wherein the molecular sieve comprises zeolite A and elemental silver.

20. The method according to claim 13 wherein the molecular sieve consists essentially of zeolite A and elemental silver.

21. The method according to claim 13 wherein the zeolite A contains 0.001–1% elemental silver.

22. The method according to claim 13 wherein the zeolite A is zeolite 4A.

23. A method for simultaneously removing mercury and water from a gas comprising contacting the gas with an effective amount of a molecular sieve comprising zeolite 4A containing on its surface 0.001–15% by weight of elemental silver and regenerating the molecular sieve for simultaneous water and mercury removal at elevated temperatures.

24. A method for simultaneously removing mercury and water from a gas comprising contacting the gas with an effective amount of a molecular sieve comprising zeolite 4A containing ion its cavities 0.001–5% by weight of elemental silver and regenerating the molecular sieve for simultaneous water and mercury removal at elevated temperatures.

25. The method according to claim 24 wherein the zeolite 4A contains 0.001–1% by weight of elemental silver.

26. A regenerable molecular sieve capable of simultaneously removing mercury and water from a fluid, comprising zeolite A containing on its surface about 0.001–15% by weight of elemental silver or gold.

27. A molecular sieve according to claim 26, which consists essentially of zeolite A containing on its surface about 0.001–15% by weight elemental silver or gold.

28. A molecular sieve according to claim 26, which comprises zeolite A containing elemental silver.

29. A molecular sieve according to claim 28 wherein the silver is impregnated onto the zeolite A by treating the zeolite A with an aqueous solution of a silver salt of a carboxylic acid and heating the zeolite A so treated in the absence of oxygen at a temperature capable of decomposing the silver acetate.

30. A molecular sieve according to claim 29 wherein the silver salt is silver acetate.

31. A molecular sieve according to claim 29 wherein the treated zeolite A is heated in flowing hot gas.

32. A molecular sieve according to claim 31 wherein the gas is natural gas.

33. A molecular sieve according to claim 29 wherein the zeolite A treated with silver salt solution is heated to a temperature between about 100° C.–600° C.

34. A molecular sieve according to claim 26 wherein the zeolite A is zeolite 4A.

35. A molecular sieve according to claim 34 wherein the zeolite A is zeolite 5A.

36. A molecular sieve according to claim 34 wherein the zeolite A is zeolite 3A.

37. A molecular sieve according to claim 26 wherein the zeolite A is capable of being regenerated for the purpose of simultaneously removing mercury and water from a fluid more than 100 times by heating at 340° C. for one hour.

38. A molecular sieve capable of simultaneously removing mercury and water from a fluid, consisting essentially of zeolite A containing on its surface 0.001–10% elemental silver, wherein the zeolite A is capable of being regenerated more than 100 times for such simultaneous removal by heating at 340° C. for one hour.

39. A bed of regenerable zeolite A containing on its surface 0.001–15% by weight of elemental silver or gold capable of simultaneously removing mercury and water from a fluid wherein the zeolite A is substantially uniformly coated with the silver or gold throughout the bed.

40. A bed of regenerable zeolite A containing on its surface 0.001–15% by weight of elemental silver or gold capable of simultaneously removing mercury and water from a fluid wherein the silver or gold is more heavily concentrated at the end of the bed away from the direction of fluid flow.

41. A bed of regenerable zeolite A according to claim 40 wherein the silver or gold is present in the $\frac{2}{3}$ of the bed away from the direction of fluid flow.

42. A bed of regenerable zeolite A according to claim 40 wherein the silver or gold is present in the $\frac{1}{2}$ of the bed away from the direction of fluid flow.

43. A bed of regenerable zeolite A according to claim 40 wherein the silver or gold is present in $\frac{1}{3}$ of the bed away from the direction of fluid flow.

44. A regenerable molecular sieve capable of simultaneously removing mercury and water from a gas comprising zeolite 4A containing on its surface about 0.001–15% by weight of elemental silver.

45. A molecular sieve according to claim 44 wherein the zeolite A is capable of being regenerated for the purpose of simultaneously removing mercury and water from a fluid more than 100 times by heating at 340° C. for one hour.

46. A molecular sieve capable of simultaneously removing mercury and water from a gas, consisting essentially of zeolite 4A containing on its surface 0.001–10% elemental silver, wherein the zeolite 4A is capable of being regenerated more than 100 times for such simultaneous removal by heating at 340° C. for one hour.

47. A regenerable molecular sieve capable of simultaneously removing mercury and water from a liquid, comprising zeolite A containing in its cavities about 0.001–5% by weight of elemental silver or gold.

48. A molecular sieve according to claim 47, which consists essentially of zeolite A containing about 0.001–1% by weight elemental silver or gold.

49. A molecular sieve according to claim 47, which comprises zeolite A containing elemental silver.

50. A molecular sieve according to claim 47 wherein the zeolite A is zeolite 4A.

51. A molecular sieve according to claim 47 wherein the zeolite A is zeolite 5A.

52. A molecular sieve according to claim 47 wherein the zeolite A is zeolite 3A.

53. A molecular sieve according to claim 47 wherein the zeolite A is capable of being regenerated for the purpose of simultaneously removing mercury and water from a fluid more than 100 times by heating at 340° C. for one hour.

54. A regenerable molecular sieve capable of simultaneously removing mercury and water from a gas, comprising zeolite 4A containing ion its cavities about 0.001–1% by weight of elemental silver.

55. A molecular sieve according to claim 54 wherein the zeolite 4A is capable of being regenerated for the purpose of simultaneously removing mercury and water from a gas more than 100 times by heating at 340° C. for one hour.

56. A method for impregnating zeolite A with elemental silver comprising treating zeolite A with a solution of a silver salt capable of decomposing directly to elemental silver and heating the impregnated zeolite A in the absence of oxygen at a temperature sufficient to decompose the silver salt.

57. The method according to claim 56 wherein the impregnated zeolite A is heated at a temperature of 180° C.–500° C.

58. The method according to claim 56 wherein the salt is a salt of a carboxylic acid.

59. The method according to claim 58 wherein the salt is silver acetate.

60. The method according to claim 56 wherein the salt is impregnated onto zeolite that is on-line in a dryer vessel.

61. A method for adding elemental silver to zeolite A comprising impregnating zeolite A with a solution of a silver salt and reducing the silver salt impregnated on the zeolite A to elemental silver.

62. The method according to claim 61 wherein the salt is silver nitrate.

* * * * *